Figure 1:
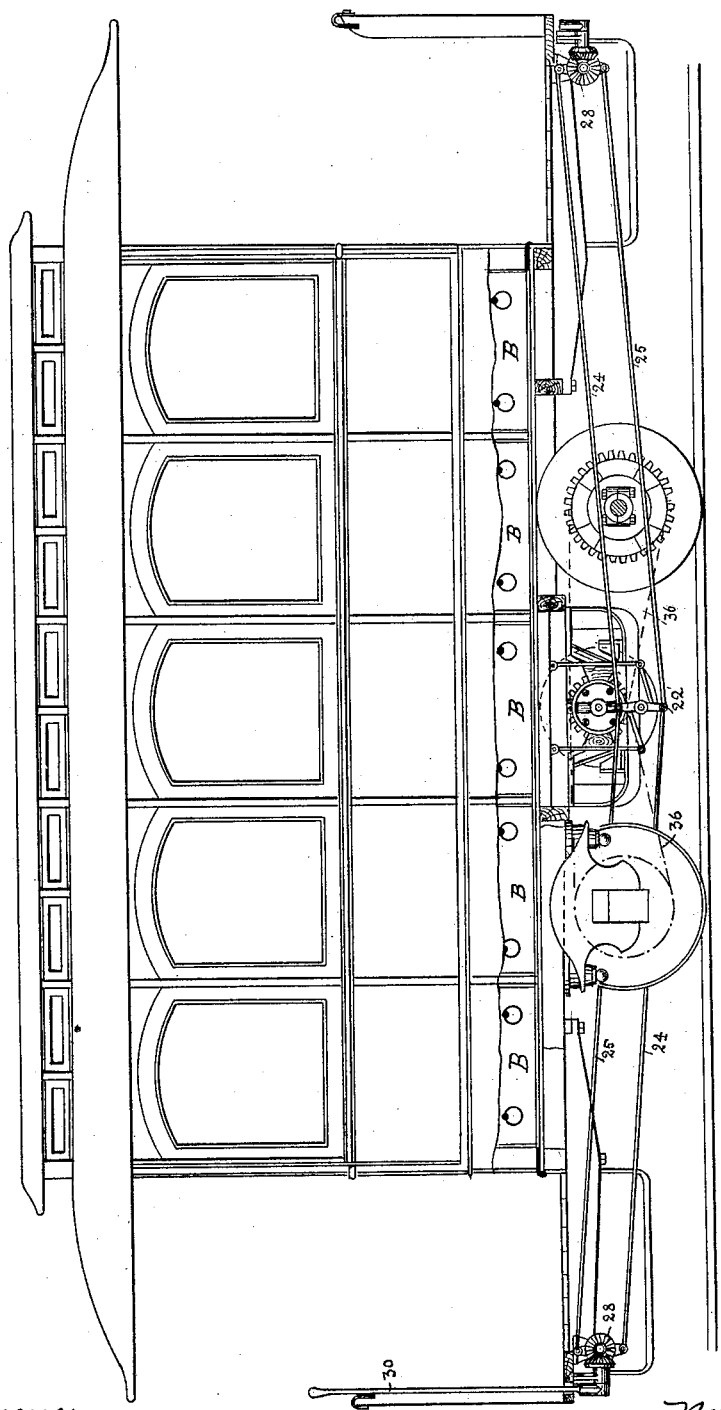

(No Model.) 5 Sheets—Sheet 1.

W. MAIN.
METHOD OF VEHICLE PROPULSION BY ELECTRIC MOTORS.

No. 407,093. Patented July 16, 1889.

Witnesses
JJ Kennedy
TH Palmer

Inventor
William Main
By his Attorneys Philipp Phelps Thorp (No Model.) 5 Sheets—Sheet 2.

W. MAIN.
METHOD OF VEHICLE PROPULSION BY ELECTRIC MOTORS.

No. 407,093. Patented July 16, 1889.

Witnesses
J. J. Kennedy
T. H. Palmer

Inventor
William Main
By his Attorneys

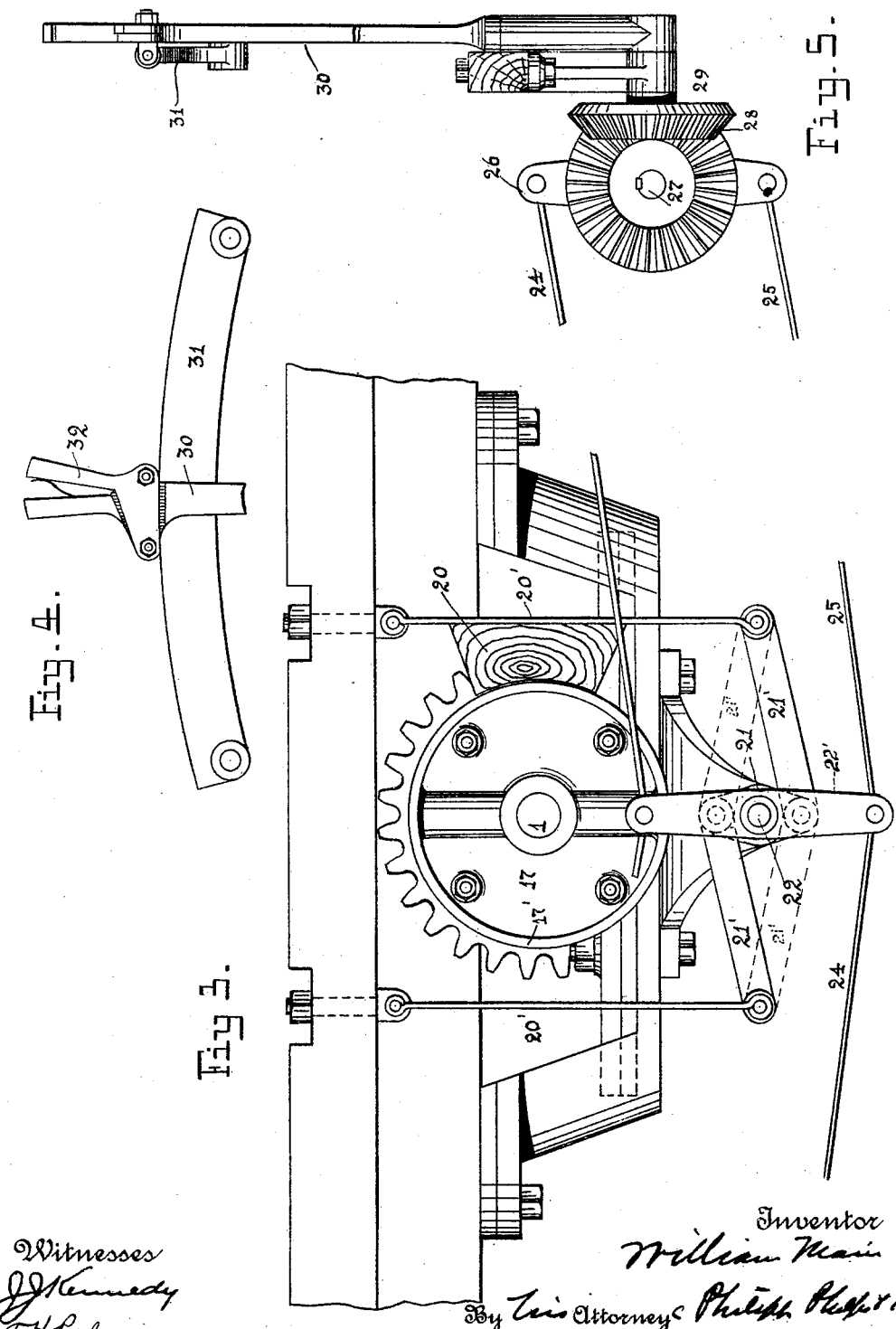

(No Model.) 5 Sheets—Sheet 4.
W. MAIN.
METHOD OF VEHICLE PROPULSION BY ELECTRIC MOTORS.
No. 407,093. Patented July 16, 1889.
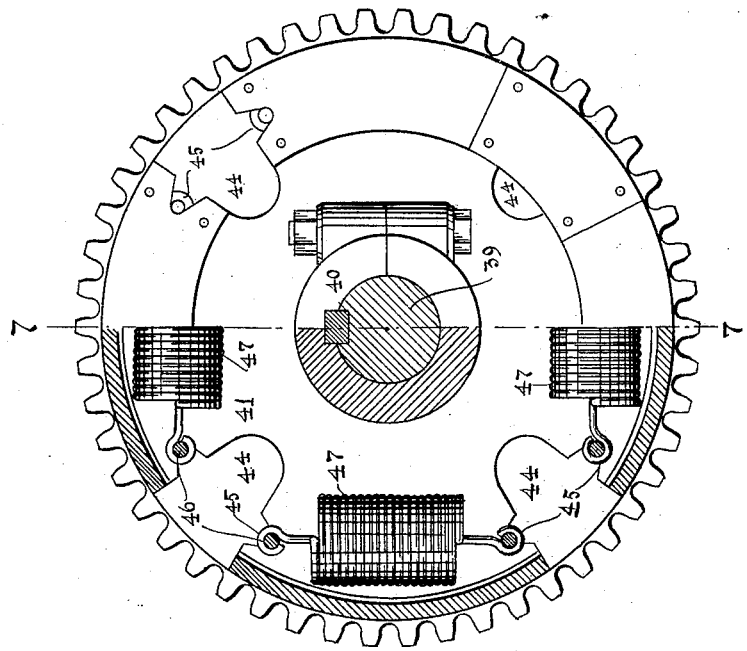
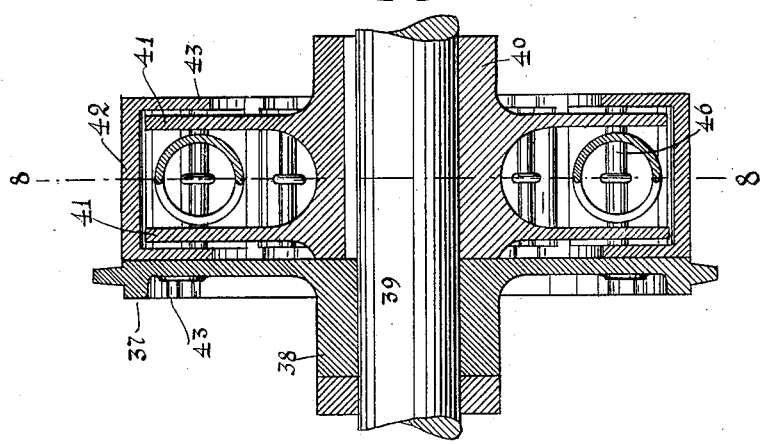
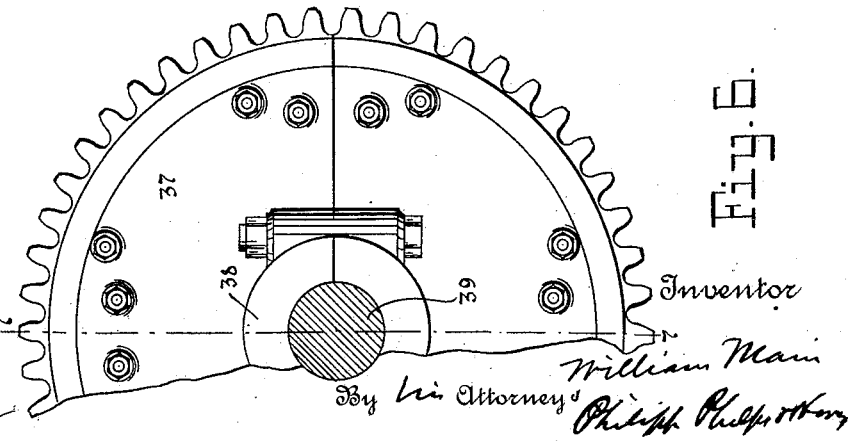

(No Model.) 5 Sheets—Sheet 5.
W. MAIN.
METHOD OF VEHICLE PROPULSION BY ELECTRIC MOTORS.
No. 407,093. Patented July 16, 1889.
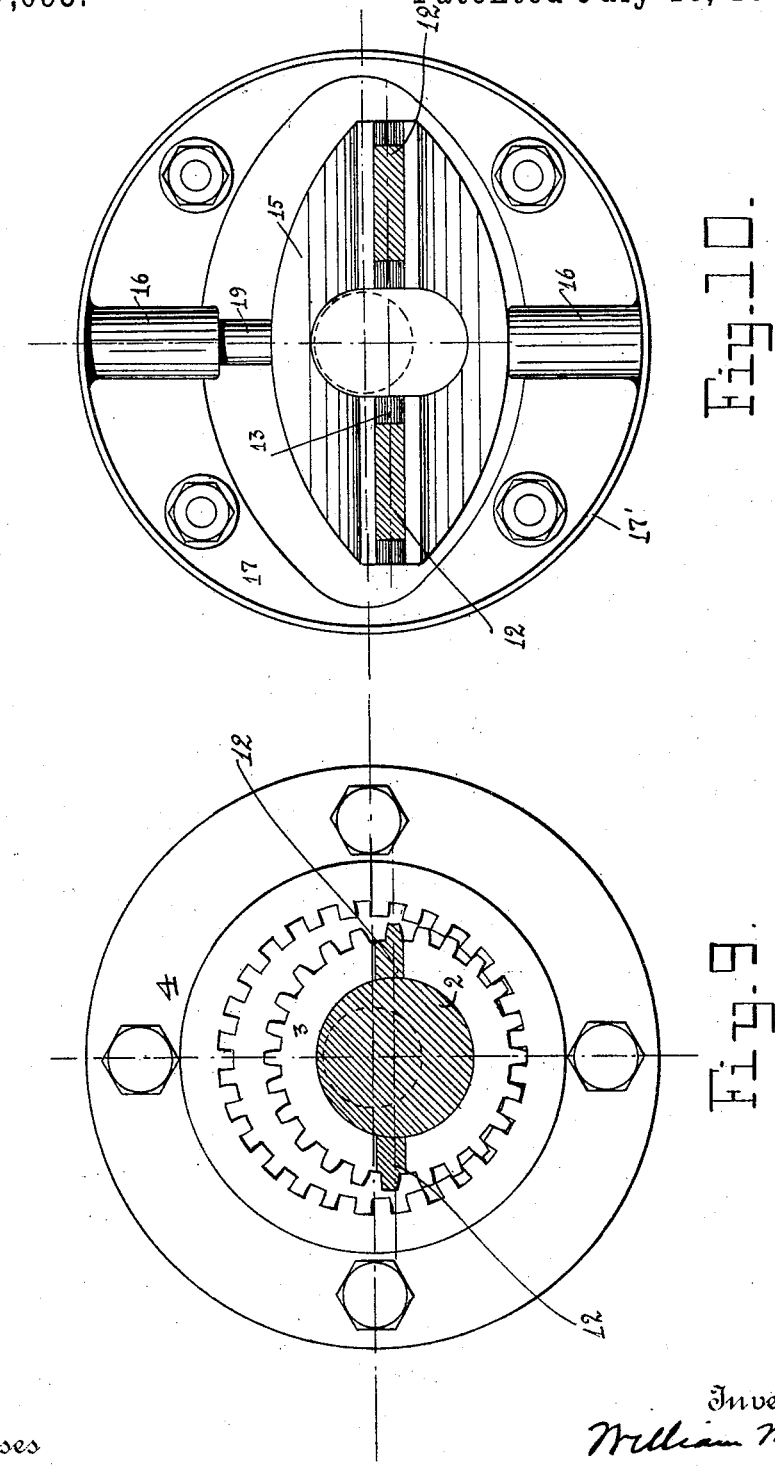

UNITED STATES PATENT OFFICE.

WILLIAM MAIN, OF BROOKLYN, NEW YORK.

METHOD OF VEHICLE-PROPULSION BY ELECTRIC MOTORS.

SPECIFICATION forming part of Letters Patent No. 407,093, dated July 16, 1889.

Original application filed October 28, 1887, Serial No. 253,610. Divided and this application filed August 21, 1888. Serial No. 283,354. (No model.)

*To all whom it may concern:*

Be it known that I, WILLIAM MAIN, a citizen of the United States, residing at Brooklyn, county of Kings, and State of New York, have invented certain new and useful Improvements in Methods of Vehicle-Propulsion by Electric Motors, fully described and represented in the following specification and the accompanying drawings, forming a part of the same.

My invention relates, generally, to the propulsion of cars or other vehicles by electrical power, and particularly to a method of utilizing said power, so as to permit of the employment of a smaller motor than has heretofore, under like conditions of roadway and load, been deemed necessary, and when secondary batteries are employed for supplying the motor-circuit to insure a uniform discharge or feed from said batteries practically free from sudden and extreme variation.

In an application for Letters Patent filed by me on the 28th day of October, 1887, Serial No. 253,610, and of which the present application is a division, I have shown and described an organization whereby my improved method may be practiced. In said application I have pointed out the difficulties in the practical employment of electric motors for the running of vehicles, which my present invention is designed to overcome. Principal among these difficulties has been that the starting of the car or other vehicle requires a much greater amount of power than its propulsion after the starting has been effected, necessitating, where batteries are employed, the carriage of a very great amount of battery material which otherwise would not be required, besides an otherwise unnecessary size of motor, and, where third rails or suspended wires are used to complete the circuit, necessitating both an extraordinary amount of current-power as well as of motor-power. This difficulty results, obviously, from the fact that the entire inertia of the vehicle has to be overcome at the moment of starting, the load being necessarily the same at this time as afterward, while in the case of applications of electric power to the driving of machinery it is generally practicable to reduce the load at the moment of starting and to apply portions of the driven machinery, or of the work to be accomplished, gradually and successively.

Another serious difficulty encountered has been that the coils of the motor are in starting and stopping the car subjected to liability of burning out, for the reason that at such times the motor, being stationary or revolving at a slow rate of speed, develops little or no counter electro-motive force, the entire force of the current then acting upon the wires of the coils and creating great heat. It will be understood that when the motor revolves at its normal speed in the propulsion of the car it tends to generate a current running counter to the main current, and thus reduces the tension of the latter, and that when the speed of rotation is materially diminished this counter electro-motive force is in like degree decreased, and by the same amount the effect of the propelling current upon the coils of the motor in the way of heating is increased, from which the danger to the coils arises. This liability has hitherto proved almost an insuperable obstacle to the use of electric motors for the driving of street-cars and for other purposes of locomotion, because of the frequently-recurring occasions for arresting the motion of the vehicle and the impossibility of cutting off the driving-current during the time when motion is wholly or partially arrested, because of the necessity of using the whole power of that current for again starting the vehicle. These latter difficulties have been encountered both where a current from a stationary dynamo has been used for propelling the vehicle and in an aggravated degree where storage-batteries carried upon the vehicle have been employed for that purpose. This arises from the fact that the most favorable conditions for the use of storage-batteries are those in which the demands upon them are constant and not subject to any sudden or extreme variations. The effect of such variations where storage-batteries in which active material mechanically applied or attached to conducting-supports is used is to cause disintegration of the masses or wads of active material at the points where they come in contact with the conducting-supports, promoting the formation of sulphate at those points and rapidly effecting the separation of the active material from the conducting-supports, and thus causing a liability of the active material to drop away from the conducting-supports and accumulate in the bottom of the cell. It results that a storage-battery of the common mechanically-applied active-material type very soon becomes inoperative when applied to these purposes.

These difficulties are overcome in the practice of my invention in the following manner: Instead of arresting the rotation of the motor when stopping the car I propose to interrupt the driving-connection between the motor-shaft and the driving-axle, permitting the rotation of the motor to continue. The stops of the vehicle being generally for a brief period only, this will result in but slight loss of electrical power, while it will subject neither the motor nor the batteries to the effect of sudden variations in the tension of the driving-current, and it will permit the entire force of the current to be applied to the motor in the starting of the vehicle without danger to any of the parts of the apparatus. Moreover, the motor and connected parts, by virtue of their revolution at a high rate of speed, will maintain stored up a very considerable amount of force, which can be utilized in the starting of the car, and will, in connection with the devices which I propose to use for effecting the gradual application of power to the driving-axles, enable the starting to be effected without the application of any considerably greater amount of power than is normally required for the propulsion of the vehicle when in full motion.

In the drawings annexed to this specification is illustrated an organization as applied to a street-car adapted for the practice of my invention.

Figure 2:
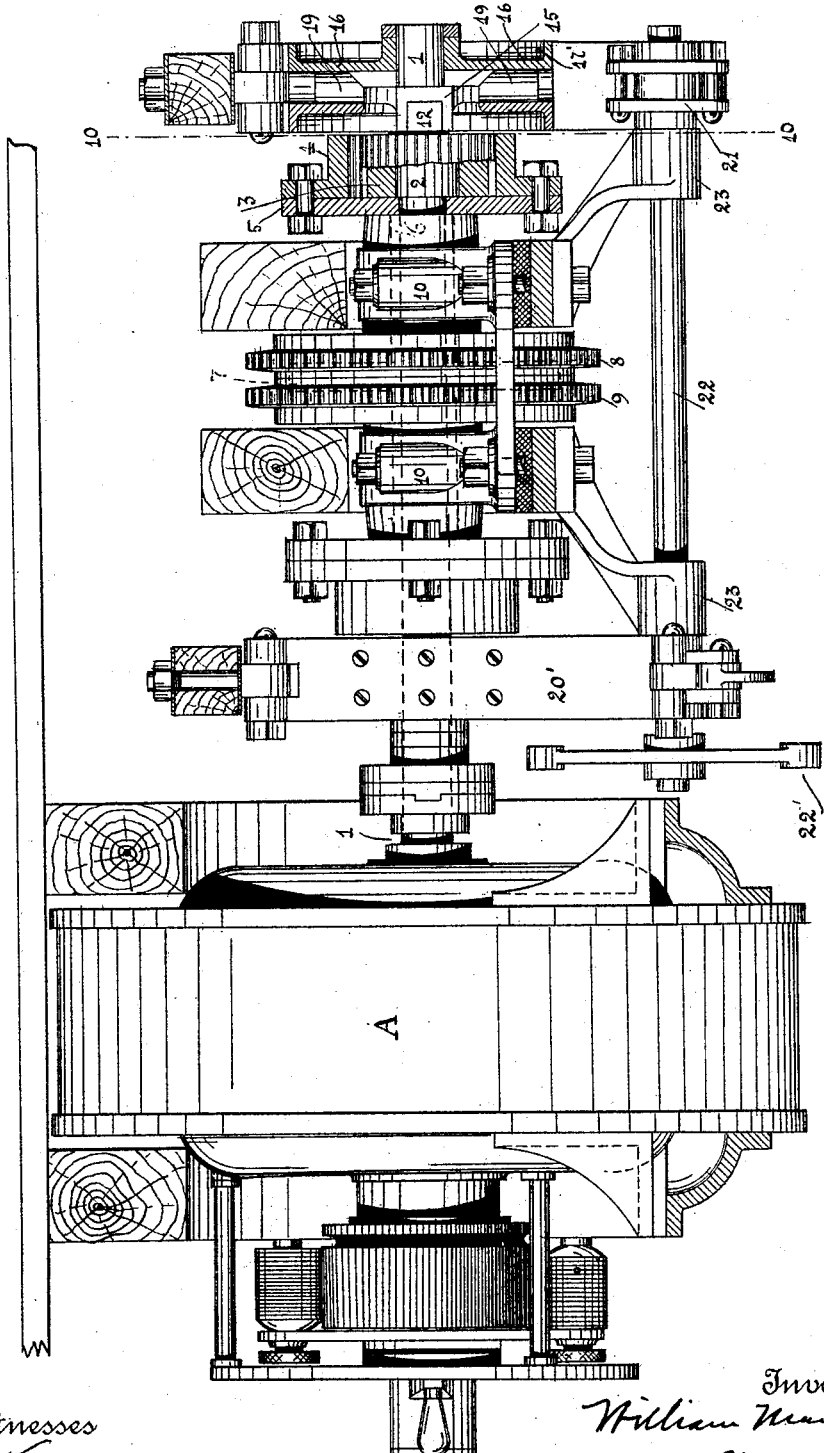

Figure 1 is a side view, partly in section, of said car. Fig. 2 is a side view of the motor and power-transmitting device mounted upon the shaft thereof. Fig. 3 is an end view of the motor-shaft and a part of the power-transmitting device upon an enlarged scale. Figs. 4 and 5 are details, on the same scale, of mechanism for controlling the movement of the car. Figs. 6, 7, and 8 represent, on the same enlarged scale, spring connecting devices between the motor and the driven axle, Fig. 6 being a side view, Fig. 7 a vertical section on the line 7 7, Figs. 6 and 8, and Fig. 8 a side view, partly in section, on the line 8 8, Fig. 7; and Figs. 9 and 10 are detail views, on an enlarged scale, of the motion-reducing device, Fig. 9 being a section on the line 10 10, Fig. 2, the point of view being to the right of said line, and Fig. 10 a section taken on the same line, the point of view being to the left of said line.

Suspended beneath the frame-work of the cars is the motor A, the main shaft of which is connected through the motion-reducing mechanism with the axle of the car-truck. This motion-reducing mechanism will first be described. The shaft 1 of the motor carries fast upon it an eccentric 2, which moves freely in a circular opening within gear-wheel 3, which gear-wheel constitutes the fixed or initial member of a "sun-and-planet" series of gears. Outside of and about this gear-wheel is an annular gear 4, concentric with the driving-shaft 1 and bolted to a flange 5 of a sleeve or hollow shaft 6, (shown in Fig. 2 partly by broken lines,) mounted upon the main shaft and carrying at its inner end a flange 7, upon which is formed a sprocket-wheel 8, from which the power is transmitted to one of the car-axles. The sleeve 6 rests in suitable bearings 10, secured to the car-frame. On the inner side of the sprocket-wheel 8 is arranged upon the motor-shaft another sprocket-wheel 9, rigid with the wheel 8, and from which the power is transmitted to the other car-axle, and a second set of devices identical with those above described, except that the ratio between the inner and outer gear-wheels is varied, this additional mechanism being provided in order that it may be possible to change the speed of the car without changing that of the motor.

Upon the inner gear-wheel 3 (see particularly Figs. 2, 10, and 11) are cast lugs 12, fitted to and adapted to slide in a recess or channel 13, formed in a cross-head 15. This cross-head is in turn provided with cylindrical lugs 19, fitting cylindrical sockets 16, formed in a pulley mounted upon and rotating freely about the main shaft. Pulley 17 has a rim 17', which serves as a friction-wheel. The cross-head 15 has an oblong central opening which permits it to move in the direction of its lugs 19 over the main shaft 1. It is obvious that the gear 3 and the pulley 17 will maintain fixed positions relative to each other as regards rotation, their absolute relative positions changing as the shaft 1 revolves to the extent of the sliding motion of the cross-head 15 in pulley 17 and of lugs 12 in channel 13, caused by the eccentric position of the gear 3 with reference to the axis of the pulley 17, the lugs 12 and cross-head 15 constituting double slides moving in right lines, and uniting the gear and the pulley as regards circular motion. Consequently when the pulley 17 freely revolves about its axis the gear 3 is also free and will convey no power from the shaft to the outer gear 4. When, however, the pulley 17 is locked or held fast in one position, the gear 3 will be carried about by the eccentric in a position constantly parallel to itself and will communicate to the outer gear 4 a rotating motion reduced to an extent dependent upon the ratio between the two gears. The amount of this reduction may be readily calculated according to well-known rules which require no special explanation here.

It is necessary to provide devices for the locking of the pulley 17, in order to effect the transmission of power through the gears, and for this purpose I prefer to use a friction-clutch, although any other form of clutch mechanism—for instance, a spring-clutch—may be employed, as illustrated in Figs. 1, 2, 3, and 4, wherein brake-shoes 20 are shown attached to pivoted hangers 20', the lower ends of these hangers being connected by rods 21' to a cross-piece 21, fastened upon a shaft 22, mounted in bearings 23, which shaft is revolved, as desired, to throw the shoes to or from the rim 18 by rods 24 and 25, two sets of which are provided, passing from cross-piece 22', fixed upon a shaft 22, to each end of the car, and connecting at each end with a cross-bar 26 upon a shaft 27, the latter shaft being connected by bevel-gears 28 with a shaft 29, attached to a lever 30, adapted to move along a segmental bar 31, and to be arrested by a spring-catch 32 at any desired point thereof in the manner usual with railroad-switch and similar levers. In the mechanism shown two of these sets of brake-shoes are employed, one for each of the pulleys 17, so connected with their cross-pieces 21' that in one position of the shaft 22 one of the said pulleys is arrested and the other released, and in the other position thereof the action of the shoes upon the pulleys is reversed. The arrangement of the second set of rods 21' is shown in broken lines in Fig. 3. By the use of this mechanism the position of the controlling-shaft 22 may be determined and adjusted from either end of the car by the use of the appropriate lever, and either one of the two sets of gears may be thus brought into operation, according to the speed to be given to the car, and both may be thrown out of operation in order to arrest the action of the motor upon the car-axles by causing the shaft to assume an intermediate position wherein neither of the pulleys will be held. If more than two speeds are desired for the car, the number of sets of gears and controlling mechanism will be accordingly increased. The motor is driven by the current from the storage-battery B or other source of electricity. The usual springs between the car-body and the truck are supposed to be used, though not shown in the drawings.

Power is transmitted from sprocket-wheel 8 to one of the car-axles and from wheel 9 to the other by means of chains 36 passing one to the forward and the other to the rear axle and engaging with other sprocket-wheels 37, mounted thereon in a manner and with connected parts which will be described. The sprocket-wheel 37 consists in each case of a circular flange carrying the sprocket-teeth and integral with a hub 38, mounted so as to revolve freely upon the axle 39. Adjoining the hub 38 is a sleeve 40, keyed to the axle and provided with two circular flanges 41, parallel to each other and a short distance apart. To the flanges 37 is bolted a circular cap 42, having two inwardly-projecting circular flanges 43, embracing the flanges 41. Flanges 41 are provided with a suitable number of recesses or openings 44, of which four are shown in this instance, and the flanges 43 are provided with an equal number of similar openings, so placed as to accurately register with the recesses 44. In both the flanges 41 and 43 and in the sides of the openings above described are placed notches 45, registering with each other in all the flanges and adapted to serve as bearings for transverse rods 46, which rest in them and which rods are connected in pairs by springs 47, which springs will normally hold the two sets of flanges in such relation to each other that the openings or recesses therein will precisely register, as shown in Fig. 8. With this construction the stress of the motor when thrown upon the flange 37 will tend to turn the flange 37 and the hub 38 upon the axle, and this tendency will be resisted by the rods 46 and springs 47. The springs are of such tension as to permit a certain small amount of movement between the parts which they connect, but after permitting such slight movement their strength is sufficient to transmit the driving-power of the motor. It results that the flange 37 and the sleeve 40, and consequently the axle 30, after the play of the springs is exhausted, move together and give motion to the car, and it will be observed that it is immaterial in which direction the flange 37 is caused to revolve, the result with either direction of motion being the same so far as the action of the springs and flanges is concerned—in other words, the car may be caused to move forward or backward with precisely the same operation in each case of the power-transmitting mechanism by reversing the direction of rotation of the motor-shaft.

It will be understood that the novel features in construction hereinbefore described are the subject-matter of other pending applications, said applications bearing Serial Nos. 253,610 and 283,355, and having been filed, respectively, October 28, 1887, and August 21, 1888, and are not claimed in this application, which is restricted wholly to the method of attaining the desired results, and that the apparatus herein described is only one of many forms of apparatus adapted to the practice of my present invention, and that I do not limit myself to any particular device or combination of devices.

Any device for interrupting the transmission of power from the motor-shaft while the latter is revolving might be substituted for the devices shown herein for accomplishing those results without departing from my invention.

My invention may be practiced with but a single power-transmitting device and without provision for changing speed, if desired.

The spring-bearings on the driving-axles of the car are not essential to an apparatus adapted for the practice of my invention, but are shown herein for the reason that they are a part of the best form of organized apparatus now known to me.

If desired, primary batteries may be substituted for the storage or secondary batteries herein referred to.

Having thus described my invention, what I claim is—

In the propulsion of vehicles and the like by electric motors actuated by batteries, the method of obtaining the maximum effect from the motor without deterioration of the battery, which consists in maintaining the flow of current from the battery and maintaining continuous revolution of the motor itself during temporary stoppages of the vehicle, whereby the drain upon the battery is continuous and the power of the motor during said stoppages is accumulated in inertia utilizable at the next starting.

In testimony whereof I have hereunto set my hand in the presence of two subscribing witnesses.

WILLIAM MAIN.

Witnesses:
J. J. KENNEDY,
T. H. PALMER.